United States Patent
Karpman

(10) Patent No.: US 8,113,524 B2
(45) Date of Patent: Feb. 14, 2012

(54) HUBLESS PERSONAL VEHICLE

(76) Inventor: Alon Karpman, Brooklyn, NY (US)

( * ) Notice: Subject to any disclaimer, the term of this patent is extended or adjusted under 35 U.S.C. 154(b) by 0 days.

(21) Appl. No.: 12/995,632

(22) PCT Filed: Jul. 9, 2008

(86) PCT No.: PCT/US2008/069553
§ 371 (c)(1),
(2), (4) Date: Dec. 1, 2010

(87) PCT Pub. No.: WO2010/005433
PCT Pub. Date: Jan. 14, 2010

(65) Prior Publication Data
US 2011/0074127 A1 Mar. 31, 2011

(51) Int. Cl.
A63C 17/00 (2006.01)

(52) U.S. Cl. ........... 280/63; 280/47.131; 280/87.042; 280/11.19; 280/11.233

(58) Field of Classification Search .... 280/11.24–11.26, 280/87.01–87.05, 252–258, 220–221, 63, 280/43.1; 301/5.1, 105.1
See application file for complete search history.

(56) References Cited

U.S. PATENT DOCUMENTS

| | | |
|---|---|---|
| 4,186,934 A | 2/1980 | Collings |
| 4,761,014 A | 8/1988 | Huang |
| 4,861,054 A | 8/1989 | Spital |
| 4,861,055 A | 8/1989 | Jones |
| 4,955,626 A * | 9/1990 | Smith et al. ............... 280/87.042 |
| 5,280,935 A | 1/1994 | Sobocan |
| 5,419,619 A | 5/1995 | Lew |
| 5,458,351 A * | 10/1995 | Yu ............................ 280/87.042 |
| 5,490,719 A | 2/1996 | Lew |
| 5,505,474 A * | 4/1996 | Yeh ........................... 280/87.042 |
| 5,826,674 A | 10/1998 | Taylor |
| 5,975,229 A * | 11/1999 | Hosoda ........................ 180/181 |
| 5,992,864 A | 11/1999 | Dickson |
| 6,079,727 A | 6/2000 | Fan |
| 6,189,907 B1 | 2/2001 | Nelson et al. |
| 6,206,389 B1 | 3/2001 | Yagi |
| 6,241,269 B1 | 6/2001 | Fan |
| 6,338,494 B1 * | 1/2002 | Killian ..................... 280/87.042 |
| 6,357,544 B1 | 3/2002 | Kamen |
| 6,398,237 B1 | 6/2002 | Attey |
| 6,398,244 B1 | 6/2002 | Chueh |
| 6,405,816 B1 | 6/2002 | Kamen |
| 6,419,251 B1 | 7/2002 | Chueh |
| 6,705,630 B1 * | 3/2004 | Karpman ..................... 280/253 |
| 7,980,568 B2 * | 7/2011 | Chen ......................... 280/11.24 |
| 2002/0149166 A1 * | 10/2002 | Potter ....................... 280/87.042 |
| 2003/0075890 A1 * | 4/2003 | Jacobs ...................... 280/87.042 |
| 2004/0036248 A1 * | 2/2004 | Karpman ..................... 280/253 |
| 2007/0200306 A1 * | 8/2007 | Cerrito ...................... 280/14.24 |
| 2010/0090440 A1 * | 4/2010 | Reichstetter et al. ......... 280/293 |
| 2011/0074127 A1 * | 3/2011 | Karpman ........................ 280/63 |

FOREIGN PATENT DOCUMENTS

WO   WO 00/75001   12/2000

* cited by examiner

Primary Examiner — J. Allen Shriver, II
Assistant Examiner — James Triggs
(74) Attorney, Agent, or Firm — Jennifer Meredith, Esq.; Meredity & Keyhani, PLLC

(57) ABSTRACT

A personal vehicle for carrying a passenger, the vehicle comprising: a center frame; two wheel assemblies, wherein at least one wheel assembly is hubless; a foot support in a center portion of at least one wheel assembly; and at least one pivot means between at least one wheel assembly and the center frame.

15 Claims, 4 Drawing Sheets

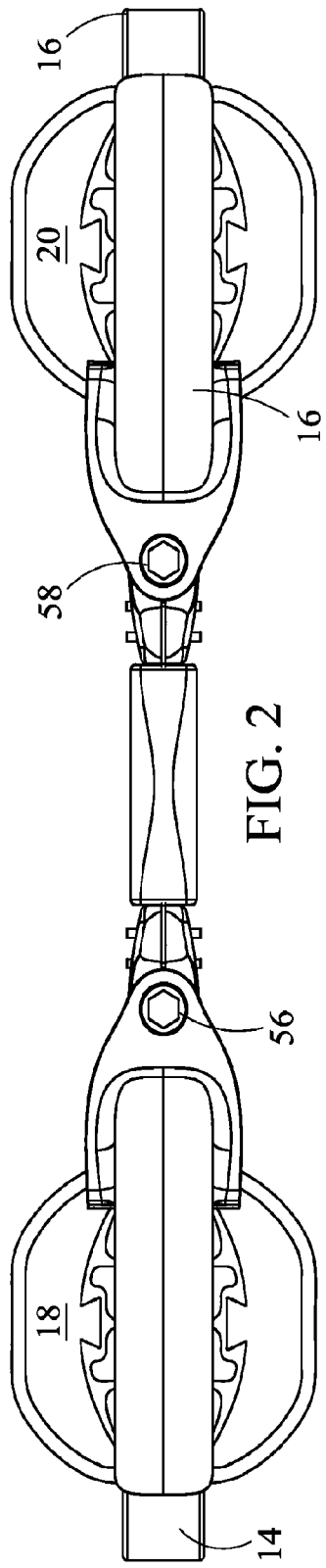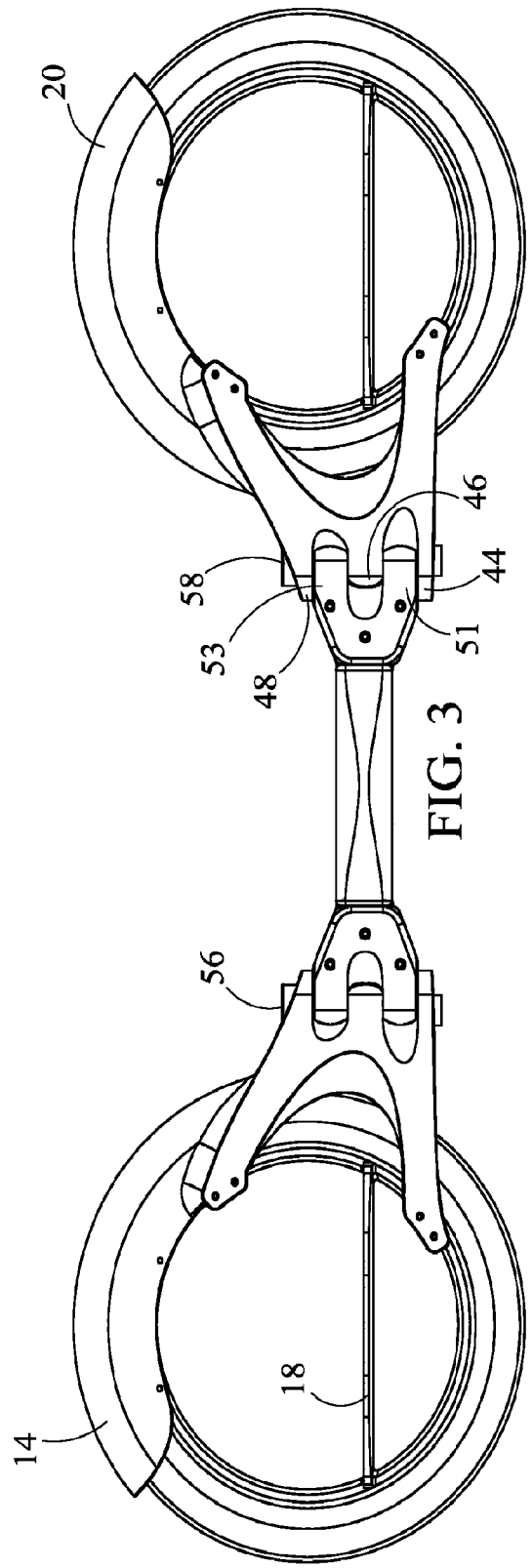

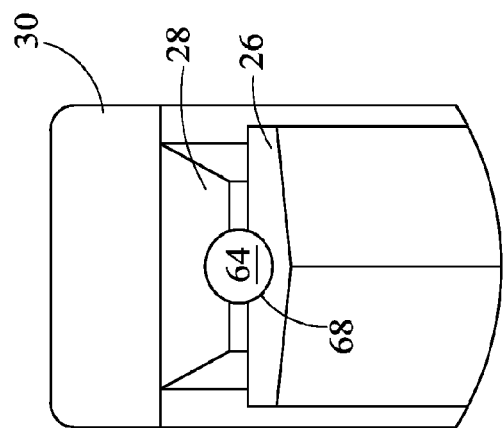
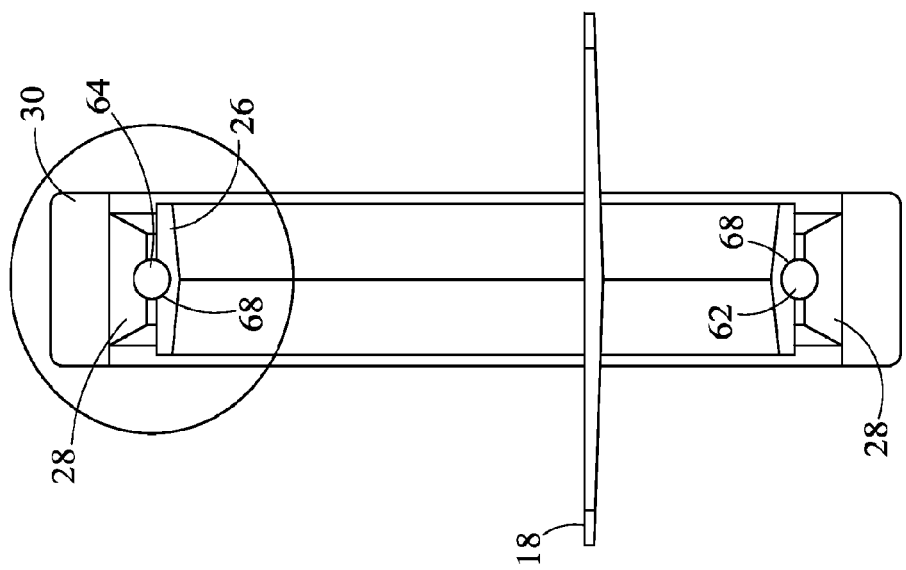

HUBLESS PERSONAL VEHICLE

BACKGROUND OF THE INVENTION

The present invention generally relates to personal vehicles including self-propelled stand-on personal vehicles.

Numerous personal vehicles are known within the art. These may include bicycles, rollerblades, skateboards and the like. Stand-on transportation devices are also known within the art. By way of example, U.S. Pat. No. 5,975,229 issued to Hosoda, discloses a stand-on transportation device with shafts to which the front wheel and the rear wheel are assembled and the frame connects these shafts. The rider is support by a footboard along the frame.

Also, known within the art are foot driven vehicles. By way of example, U.S. Pat. No. 6,079,727 issued to Fan discloses a foot driven vehicle. The '727 patent discloses the use of a foot pedal along a frame portion and connected to a crank. However, the '727 patent and similar devices do not provide stability at higher speeds. Cranking the foot pedal while traveling at high speeds and remaining stable would be difficult and dangerous, with the passenger risking falling off and injury.

Another foot driven vehicle is U.S. Pat. No. 4,761,014, issued to Huang. The '014 patent discloses a scooter with a ratchet mechanism for driving the rear wheel of the scooter, a stepping lever for transferring the stepping force of the rider to the ratchet mechanism and a retrieving means for raising the stepping lever as the stepping force is released. In this way the scooter can be propelled by the intermittent stepping force of the rider to advance forwardly. However, such a system is unstable at higher speeds. Also, it is difficult to coast and step on the lever at the same time. This results in the need to remove your foot from the lever, which can be unstable and cause the passenger to slow.

Also known within the art is The Wheelman. The Wheelman is a complicated, cumbersome, heavy, large, and expensive motorized personal vehicle. Because of the motorized nature of The Wheelman, it is loud, not safe for younger children, produces emissions, and is cost prohibitive.

Another disadvantage of the prior art, is the inability to mimic surfing and snowboarding. All previous devices have tried to mimic the surfing and snowboarding feel on land but are merely skateboards with somewhat of a surfing or snowboarding feel. In both snowboarding and surfing the riders feet are on the board at all times. None of these previous devices have allowed a rider to keep both feet on the device during propulsion, while retaining rider control and the feel of snowboarding or surfing.

Another disadvantage of the prior art is the ability to remain stable in a starting position. Accordingly, what is needed is a stable, easy to turn device that may be human powered, remain stable at higher speeds and allow the rider to keep both feet on the device. These and other features, aspects and advantages of the present invention will become better understood with reference to the following description and claims.

SUMMARY OF THE INVENTION

The present invention relates generally to personal vehicles.

According to one aspect of the present invention, a personal vehicle for carrying a passenger is provided, the vehicle comprising: a center frame; two wheel assemblies, wherein at least one wheel assembly is hubless; a foot support in a center portion of at least one wheel assembly; and at least one pivot means between at least one wheel assembly and the center frame.

According to yet another embodiment, a personal vehicle for carrying a passenger is provided, the vehicle comprising: a center frame; at least one foot support in a center portion of the hubless wheel; at least two wheel assemblies wherein at least one of the at least two wheel assemblies is a hubless wheel comprised of a non-rotational inner rim in communication with the foot support, a rotatable outer rim in communication with and rotating around the non-rotational inner rim; a wheel frame attached to the non-rotational inner rim and surrounding the rotatable outer rim, wherein the rotatable outer rim rotates between a portion of the wheel frame and the non-rotational inner rim; at least one bearing between the non-rotational inner rim and the rotatable outer rim; and at least one pivot means between each wheel assembly and center frame.

These and other features, aspects and advantages of the present invention will become better understood with reference to the following drawings, description and claims.

BRIEF DESCRIPTION OF THE DRAWINGS

FIG. 2 is a top view according to an embodiment of the present invention;

FIG. 3 is a side view of a personal vehicle according to an embodiment of the present invention;

FIG. 5 is an exploded view of a personal vehicle according to an embodiment of the present invention; and FIG. 6 is an exploded view of a personal vehicle according to an embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention discloses a personal vehicle for carrying a passenger. This may be for recreational purposes or for transportation purposes. Also, it may be utilized to replicate snowboarding, as in the case of off-season training.

Figure 1:
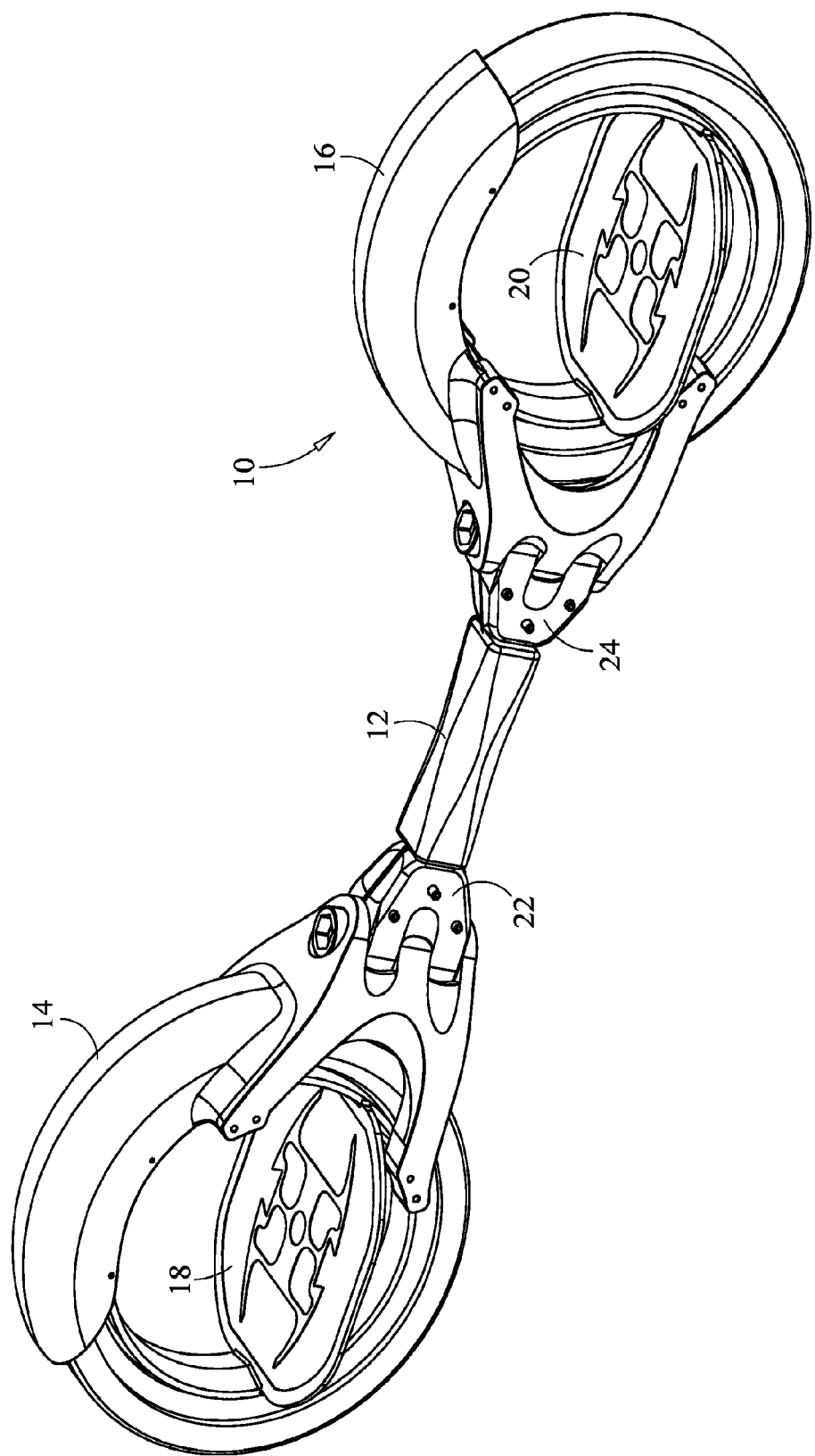
FIG. 1 is a side view according to an embodiment of the present invention.

FIG. 1 depicts a personal vehicle (10) according to the present invention. As shown, the personal vehicle has a center frame (12); two wheel assemblies (first wheel assembly (14) and second wheel assembly (16)). It is envisioned that at least one wheel assembly is hubless, the embodiment shown both wheel assemblies are hubless. The term hubless indicates that there are no hubs in the center portion of the wheel. There is a foot support (e.g. (18), (20)) in a center portion of at least one wheel assembly (e.g. (14) and (16)); and at least one pivot means ((22) and (24)) between at least one wheel assembly and center frame. For example, pivot means (22) is between front wheel assembly (14) and center frame (12) and pivot means (24) is between back wheel assembly (16) and center frame (12). The pivot means (22) may allow for pivoting at the intersection of the front wheel assembly (14) and the pivot means (22) and pivoting at the intersection of the pivot means (22) and the center frame (12). Additional pivot points provides greater stability as well allowing the user to create momentum. By way of example, the wheel assembly could be pivotally attached directly to the center frame. But this would be very rigid, would not allow the user to start in a stable position and would not allow the user to easily create momentum, which is a problem with prior art personal vehicles. The vehicle may comprise a frame and at least two wheels rotatably attached to the frame. At least one wheel may have a foot support in a center portion of at least one wheel. It should be understood that many different embodiments are envisioned. There may be one standard wheel, and one hubless wheel with a foot support in the center. Many different combinations are claimed and disclosed herein.

Figure 4:
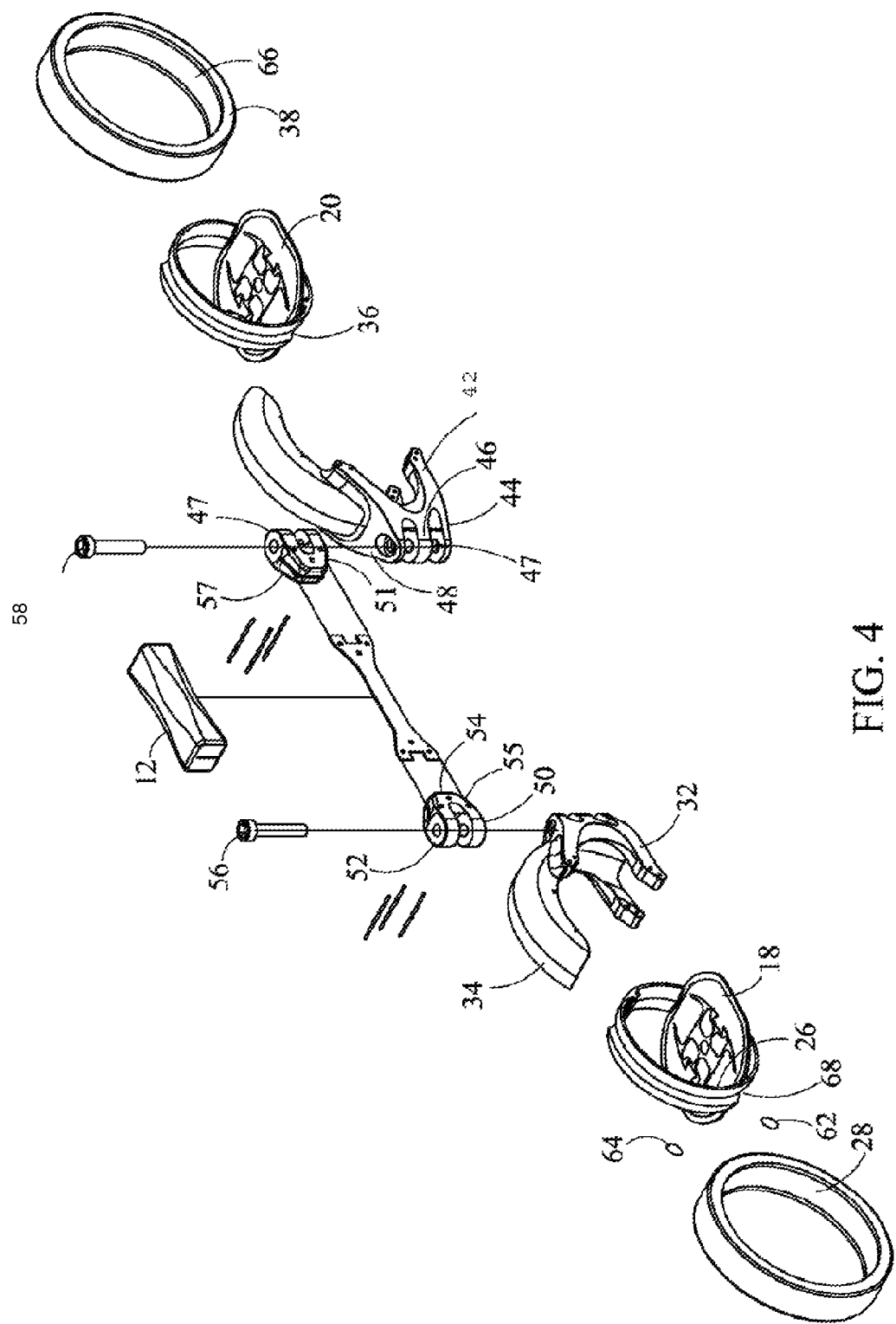
FIG. 4 is an exploded view of a personal vehicle according to an embodiment of the present invention.

As shown in FIG. 4 the wheel assembly may be comprised of: a non-rotational inner rim (26, 36) in communication with foot support (18, 20); a rotatable outer rim (28, 38) rotating around the non-rotational inner rim (26, 36); and a wheel frame (32, 42) attached to the non-rotational inner rim (26, 36) and surrounding the rotatable outer rim (28, 38), wherein the rotatable outer rim (28, 38) rotates between the wheel frame (32, 42) and the non-rotational inner rim (26, 36). The wheel assemblies (14, 16) may have at least two protruding connection means (44, 46, 48) having a center bore therethrough. That is one way of connecting the pivot means to the wheel assembly. According to the embodiment shown there are three protruding connection means (44, 46, 48) and they are integral and extend from the wheel frame (32, 42). It should be understood there may be many different connection means without departing from the present invention. The pivot means may have at least one protruding connection means (e.g. 50, 52) for receipt between the wheels at least two protruding connection means (e.g. 44, 46, 48) and having a center bore (54) therethrough, the center bore (54) of pivot means protruding connection means (50, 52) lining up with center bore (47) of the wheels protruding connection means (e.g. 44, 46, 48). A connection means (56, 58) is received in the center bore (54) of pivot means protruding connection means (e.g. 50, 52) and the center bore of the wheels protruding connection means (e.g. 44, 46, 48). FIG. 4 best depicts the preferred connection means (56, 58) as a cylinder with a bolt at top to secure the connection means. The protruding connection means of the wheels alternate with the protruding connection means of the pivot means. For example, the wheels protruding connection means (44) is in communication with the pivot means protruding connection means (51) which is in communication with the wheels protruding connection means (46) which is in communication with the pivot means protruding connection means (53) which is in communication with the wheels protruding connection means (48), each of the parts having a center bore (47) running therethrough for receipt of connection means (59) which pivotally attaches the wheel assembly (16) to the center frame (12). This is a preferred embodiment because it allows the wheels to pivot which provides initial stability and also allows for a back and forth motion while riding that provides momentum.

The foot support (18, 20) may also pivot inside the wheel assembly (14, 16). Pivot connection (60) may pivotally connect the foot support (18, 20) to the non rotational inner rim (26), such that the foot support may pivot inside the non rotational inner rim (26). As shown in FIGS. 5-6, there may be at least one bearing (62, 64) between the non-rotational inner rim (26) and rotatable outer rim (28). The bearing fits inside the non-rotational inner rim's semi-circle shaped channel (68) running center longitudinally and the rotatable outer rim's semi-circle channel running (66) center longitudinally, wherein the bearing (e.g. 62, 64) is a circular bearing and between the non-rotational inner rim's (26) semi-circle channel (68) and the semi-circle channel (66) of the rotatable outer rim. The bearings allow the rotatable outer rim to rotate around the rotationally stationary inner rim. According to a preferred embodiment, the bearings may have a width of ⅜ inches, with an inner diameter of 3/16, and an outer diameter of 11/32 inches and a 3/16 inch diameter stem. A portion of the wheel assembly (e.g. the rotationally stationary inner rim) may also act as a bearing itself.

There may also be a tire shield (34) in communication with at least a portion of the wheel assembly (14, 16). The passengers foot may then be in the center frame portion and utilize the tire shield to steer the vehicle. There may also be a removable tire (30) in communication with the rotatable outer rim (28). There may also be a folding mechanism along the frame, without departing from the present invention, so as to fold the vehicle for easy carrying and storage. The non rotational inner rim and rotatable outer rim may be attached to the frame by any means known within the art including screws, welding, composites and the like.

The center frame may be made of a composite. The term "composite" refers to the product resulting from the application to a binder of a liquid which cures to a solid. In a preferred construction, center frame is made of aluminum. The inner rim may be made of composite or steel and the outer rim may be made of composite or steel. Various composites, carbon fiber, Kevlar™, boron fiber and glass fiber may also be applied as a binder to various portions of the present invention to provide stability and are intended to be within the scope of the present invention.

It is envisioned that any enhancement device known within the art may be utilized without departing from the present invention. For example, reflectors, brake, handlebars, lights, a speedometer, an odometer may all be added to the vehicle. It should be understood, of course, that the foregoing relates to preferred embodiments of the invention and that modifications may be made without departing from the spirit and scope of the invention as set forth in the following claims.

I claim:

1. A personal vehicle for carrying a passenger, said vehicle comprising:
    a center frame;
    two wheel assemblies, wherein at least one wheel assembly is hubless;
    a foot support in a center portion of at least one said wheel assembly; and
    at least one pivot means between at least one said wheel assembly and said center frame;
    a non-rotational inner rim in communication with said foot support;
    a rotatable outer rim in communication with and rotating around said non-rotational inner rim;
    a wheel frame attached to said non-rotational inner rim and surrounding said rotatable outer rim, wherein said rotatable outer rim rotates between said wheel frame and said non-rotational inner rim;
    at least one unattached bearing between said non-rotational inner rim and said rotatable outer rim.

2. A personal vehicle as in claim 1, each of said wheel assemblies having at least two protruding connection means having a center bore therethrough.

3. A personal vehicle as in claim 2, said pivot means having at least one protruding connection means for receipt between said wheels at least two protruding connection means and having a center bore therethrough, said center bore of said pivot means lining up with said center bore of said wheels protruding connection means.

4. A personal vehicle as in claim 2, further comprising a connection means for receipt in said center bore of said pivot means and said center bore of said wheels protruding connection means.

5. A personal vehicle as in claim 1, wherein said foot support pivots inside said wheel assembly.

6. A personal vehicle as in claim 1, said non-rotational inner rim having a semi-circle shaped channel running center longitudinally and said rotatable outer rim having a semi-circle channel running center longitudinally, wherein said bearing is a circular bearing and between said non-rotational inner rim having a semi-circle channel of said non-rotational inner rim and said semi-circle channel of said rotatable outer rim.

7. A personal vehicle as in claim 1, further comprising a tire shield in communication with at least a portion of said wheel assembly.

8. A personal vehicle as in claim 1, further comprising a removable tire in communication with said rotatable outer rim.

9. A personal vehicle for carrying a passenger, said vehicle comprising:
- a center frame;
- at least one foot support in a center portion of said hubless wheel;
- at least two wheel assemblies wherein at least one of said at least two wheel assemblies is a hubless wheel comprised of a non-rotational inner rim in communication with said foot support, a rotatable outer rim in communication with and rotating around said non-rotational inner rim;
- a wheel frame attached to said non-rotational inner rim and surrounding said rotatable outer rim, wherein said rotatable outer rim rotates between a portion of said wheel frame and said non-rotational inner rim;
- at least one bearing between said non-rotational inner rim and said rotatable outer rim, wherein said bearing is unattached; and
- at least one pivot means between each said wheel assembly and said center frame.

10. A personal vehicle as in claim 9, each of said wheel assemblies having at least two protruding connection means having a center bore therethrough.

11. A personal vehicle as in claim 9, said pivot means having at least one protruding connection means for receipt between said wheels at least two protruding connection means and having a center bore therethrough, said center bore of said pivot means lining up with said center bore of said wheels protruding connection means.

12. A personal vehicle as in claim 9, further comprising a connection means for receipt in said center bore of said pivot means and said center bore of said wheels protruding connection means.

13. A personal vehicle as in claim 9, wherein said foot support pivots inside each said at least two wheels.

14. A personal vehicle as in claim 9, said non-rotational inner rim having a semi-circle shaped channel running center longitudinally and said rotatable outer rim having a semi-circle channel running center longitudinally, wherein said bearing is between said non-rotational inner rim having a semi-circle channel of said non-rotational inner rim and said semi-circle channel of said rotatable outer rim.

15. A personal vehicle as in claim 9, further comprising a removable tire in communication with said rotatable outer rim.

\* \* \* \* \*